United States Patent [19]

Kishida et al.

[11] Patent Number: 4,663,382

[45] Date of Patent: May 5, 1987

[54] NON-RIGID VINYL CHLORIDE POLYMER RESIN COMPOSITION

[75] Inventors: Kazuo Kishida, Hiroshima; Kazuo Ueda, Kawasaki; Kiyokazu Kitai; Tsuruyoshi Matsumoto, both of Ootake, all of Japan

[73] Assignee: Mitsubishi Rayon Company, Ltd., Tokyo, Japan

[21] Appl. No.: 795,518

[22] Filed: Nov. 6, 1985

[30] Foreign Application Priority Data

Nov. 12, 1984 [JP] Japan .................................. 59-237772

[51] Int. Cl.$^4$ ........................ C08L 13/00; C08L 51/04
[52] U.S. Cl. ........................................ 524/504; 525/83; 525/85
[58] Field of Search ...................... 525/85, 83; 524/504

[56] References Cited

U.S. PATENT DOCUMENTS

| | | | |
|---|---|---|---|
| 3,994,991 | 11/1976 | Okami et al. | 525/85 |
| 4,014,842 | 3/1977 | Kosugi et al. | 525/85 |
| 4,220,734 | 9/1980 | Kosugi et al. | 525/85 |
| 4,229,549 | 10/1980 | Usami et al. | 525/85 |

Primary Examiner—Allan M. Lieberman
Attorney, Agent, or Firm—Kenyon & Kenyon

[57] ABSTRACT

Disclosed is a non-rigid vinyl chloride polymer composition comprising 100 weight parts of a vinyl chloride polymer resin, 5-50 weight parts of a graft copolymer modifier and 10-300 weight parts of a plasticizer. The graft copolymer modifier is obtained by graft-polymerizing 25-150 weight parts of an alkyl ester of methacrylic acid having 1 to 4 carbon atoms in the alkyl group or a monomer mixture composed of at least more than 50% by weight of said alkyl ester of methacrylic acid onto 100 weight parts of an acrylic elastomer having a swelling degree of 5 to 25 so that the grafting ratio is not larger than 50%. The acrylic elastomer is obtained by polymerizing a mixture comprising an alkyl ester of acrylic acid having 2 to 10 carbon atoms in the alkyl group or a monomer mixture composed of at least 50% by weight of said alkyl ester of acrylic acid, and a polyfunctional crosslinking agent. The non-rigid vinyl chloride polymer composition has excellent weatherability and impact resistance, and exhibits a good molding processability.

7 Claims, No Drawings

NON-RIGID VINYL CHLORIDE POLYMER RESIN COMPOSITION

BACKGROUND OF THE INVENTION (1) Field of the Invention

The present invention relates to a non-rigid vinyl chloride polymer resin composition having excellent weatherability, impact resistance and moldability.

(2) Description of the Related Art

Vinyl chloride polymer resins are widely used as general-purpose resins, but their mechanical properties are not completely satisfactory. A vinyl chloride polymer resin (hereinafter referred to as "PVC") has poor impact strength, especially poor notched impact strength. Accordingly, various methods for improving the poor impact strength of PVC have heretofore been proposed.

For example, there are known a method in which an MBS resin obtained by graft-polymerizing a methacrylic acid ester and an aromatic vinyl compound into a conjugated diene elastomer is blended with PVC and a method in which an ABS resin obtained by graft-polymerizing a vinyl cyanide compound and an aromatic vinyl compound into a conjugated diene elastomer is blended with PVC.

Furthermore, as the composition having an improved weatherability, various compositions have been proposed which comprise PVC blended with a copolymer obtained by graft-polymerizing an alkyl ester of methacrylic acid, an aromatic vinyl compound and a vinyl cyanide compound onto a rubbery elastomer composed of a saturated polyacrylic acid alkyl ester.

The copolymer obtained in the former method contains many double bonds in the main chain of the elastomer component, and therefore, when the copolymer is used outdoors for a long time, chalking and reduction of the impact resistance tend to occur. Accordingly, the composition of the former type is not suitable for outdoor uses. A composition obtained by blending the copolymer of the latter method with a non-rigid PVC comprising a plasticizer has a good weatherability, but when this resin composition is molded and processed, the tensile elongation at a high temperature is insufficient and the moldability is reduced. Therefore, application of the latter type copolymer to a non-rigid vinyl chloride polymer resin is very difficult in practice.

SUMMARY OF THE INVENTION

Under the above-mentioned background, it is a primary object of the present invention to provide a non-rigid vinyl chloride polymer resin composition having excellent weatherability and impact resistance, and exhibiting good elongation at a high temperature and, thus, a good molding processability at the molding step.

In accordance with the present invention, there is provided a non-rigid vinyl chloride polymer resin composition comprising:

(i) 100 parts by weight of a vinyl chloride polymer resin comprising at least 70% by weight of units derived from vinyl chloride, (ii) 5 to 50 parts by weight of a graft copolymer obtained by graft-polymerizing 25 to 150 parts by weight of an alkyl ester of methacrylic acid having 1 to 4 carbon atoms in the alkyl group or a monomer mixture composed of at least 50% by weight of said alkyl ester of methacrylic acid onto 100 parts by weight of an acrylic elastomer having a degree of swelling of 5 to 25 so that the grafting ratio is not larger than 50%, which elastomer is obtained by polymerizing a mixture comprising an alkyl ester of acrylic acid having 2 to 10 carbon atoms in the alkyl group or a monomer mixture composed of at least 50% by weight of said alkyl ester of acrylic acid, and a polyfunctional crosslinking agent, and (iii) 10 to 300 parts by weight of a plasticizer.

DESCRIPTION OF THE PREFERRED EMBODIMENTS

The vinyl chloride polymer resin used in the present invention comprises at least 70% by weight of vinyl chloride units. Namely, a homopolymer of vinyl chloride and a copolymer of at least 70% by weight of vinyl chloride with up to 30% by weight of other vinyl comonomers may be used in the present invention.

The homopolymer and copolymers may be used either alone or in combination. The vinyl comonomers to be copolymerized with vinyl chloride include, for example, ethylene, propylene, vinyl bromide, vinylidene chloride, vinyl acetate, an acrylic acid ester and a methacrylic acid ester.

The graft copolymer (B) used in the present invention is obtained by grafting an acrylic elastomer (A) having a degree of swelling of 5 to 25, which is obtained by emulsion-polymerizing a mixture comprising an alkyl ester of acrylic acid or monomer mixture composed of at least 50% by weight of an alkyl ester of acrylic acid and a polyfunctional crosslinking agent, with an alkyl ester of methacrylic acid or monomer mixture composed of at least 50% by weight of an alkyl ester of methacrylic acid so that the grafting ratio is not larger than 50%, preferably from 0.1 to 50%.

The alkyl ester of acrylic acid used for the preparation of the acrylic elastomer (A) has 2 to 10 carbon atoms in the alkyl group. As specific examples, there can be mentioned ethyl acrylate, propyl acrylate, n-butyl acrylate, isobutyl acrylate, pentyl acrylate, hexyl acrylate, n-octyl acrylate and 2-ethylhexyl acrylate. Of these, n-butyl acrylate, n-octyl acrylate and 2-ethylhexyl acrylate are preferable, and n-butyl acrylate is most preferable. These monomers may be used either alone or in the form of a mixture of two or more thereof. According to need, other vinyl monomers such as an aromatic vinyl compound and a vinyl cyanide compound may be used in a minor amount.

It is indispensable that the degree of swelling of the acrylic elastomer (A) be adjusted to 5 to 25, preferably 10 to 20, by using a polyfunctional crosslinking agent at the preparation step. If the degree of swelling is lower than 5, a desired elongation for molding of the final resin composition cannot be obtained, the elasticity of the elastomer is degraded and the elastomer becomes brittle, with the result that it is difficult to impart the intended impact resistance to the final resin composition. If the degree of swelling exceeds 25, a desired elongation for molding of the final composition cannot be obtained.

In the present invention, the degree of swelling of the acrylic elastomer (A) is a value determined according to the following measuring method. Namely, an acrylic elastomer is dried on a Petri dish, and a part of the dried elastomer is immersed in methyl ethyl ketone at 30° C. for 48 hours. Then, the weight $W_1$ (g) of the swollen sample is measured. The degree of swelling is calculated from this weight $W_1$ (g) and the absolutely dry weight $W_2$ (g) of the sample according to the following formula:

Degree of swelling = $W_1/W_2$

As the polyfunctional crosslinking agent used for the preparation of the acrylic elastomer (A), there can be mentioned allyl esters of polyfunctional acids such as allyl methacrylate, diallyl phthalate, triallyl cyanurate and triallyl isocyanurate; esters of methacrylic acid and acrylic acid such as ethyleneglycol dimethacrylate, 1,3-butylene glycol dimethacrylate, trimethylolpropane triacrylate, dicyclopentenyl acrylate and dicyclopentenyl methacrylate; and vinyl compounds such as divinyl adipate and divinylbenzene. Among these compounds, those having no allyl groups, for example, divinylbenzene, 1,3-butylene glycol dimethacrylate, dicyclopentenyl acrylate and dicyclopentenyl methacrylate, are preferable. Dicyclopentenyl acrylate and dicyclopentenyl methacrylate are most preferable.

Ordinary anionic, cationic and non-ionic surface active agents may be used as the emulsifier at the step of preparing the acrylic elastomer (A). In the case of a certain emulsifier, the pH value of the polymerization system is shifted to the alkaline side. In this case, an appropriate pH-adjusting agent may be used for preventing hydrolysis of the alkyl ester of acrylic acid. The pH-adjusting agent include, for example, boric acid/potassium chloride/potassium hydroxide, potassium dihydrogenphosphate/disodium hydrogenphosphate, boric acid/potassium chloride/sodium carbonate, boric acid/sodium carbonate, potassium hydrogencitrate/citric acid, potassium dihydrogenphosphate/borax and sodium dihydrogenphosphate/citric acid.

As the polymerization initiator, an ordinary water-soluble inorganic initiator such as a persulfate may be used either alone or in combination with a sulfite, a hydrogensulfite or a thiosulfate in the form of a redox type initiator. Furthermore, a redox type initiator such as organic hydroperoxide/ferrous salt or organic hydroperoxide/sodium formaldehyde sulfoxylate or an azo compound may be used.

The polymerization may be carried out at a temperature higher than the decomposition temperature of the initiator under ordinary emulsion polymerization conditions. At the polymerization, all of the monomer or monomer mixture may be charged at a time, or all or part of the monomer or monomer mixture may be continuously added. However, in view of the polymerization stability and the ease of removal of the polymerization heat, it is preferred that the polymerization be carried out while adding continuously all or a part of the monomer or monomer mixture.

The graft copolymer (B) is then prepared by graft-polymerizing 25 to 150 parts by weight of an alkyl ester of methacrylic acid having 1 to 4 carbon atoms in the alkyl group or monomer mixture composed of at least 5% by weight of said alkyl ester of methacrylic acid in the presence of 100 parts by weight (as solids) of the above-mentioned acrylic elastomer (A) so that the grafting ratio is not larger than 50%, preferably from 0.1 to 50%.

As examples of the alkyl ester of methacrylic acid having 1 to 4 carbon atoms in the alkyl group, used for the graft polymerization, there can be mentioned methyl methacrylate, ethyl methacrylate, propyl methacrylate, isopropyl methacrylate, n-butyl methacrylate, isobutyl methacrylate and tert-butyl methacrylate. Of these, methyl methacrylate is preferable. These may be used either alone or in the form of a mixture of two or more. In view of the compatibility with the vinyl chloride polymer resin, methyl methacrylate is preferred. Other vinyl compounds such as an aromatic vinyl compound and a vinyl cyanide compound may be used in a minor amount.

If the amount of the monomer or monomer mixture to be graft-polymerized is smaller than 25 parts by weight, the operation becomes difficult at the step of coagulating and drying the obtained grafted copolymer, and even if the graft copolymer is incorporated in a vinyl chloride polymer resin, the resulting resin composition has extremely poor molding processability and low impact strength. If the amount of the monomer or monomer mixture is larger than 150 parts by weight, even if the graft copolymer is blended in a vinyl chloride polymer resin, the impact strength-improving effect is low.

The graft polymerization may be carried out by adding the monomer or monomer mixture at a time, continuous or discontinuously. Furthermore, the graft polymerization may be carried out in one stage or in multiple stages.

It is important that the graft polymerization be performed so that the grafting ratio is not larger than 50%, preferably from 0.1 to 50%. If the grafting ratio is higher than 50%, it is difficult to attain the intended improvement of the tensile elongation at a high temperature, and the molding processability is degraded.

The grafting ratio referred to in the present invention is the value determined according to the following method. An eggplant-shape flask is charged with a certain amount ($W_3$ g) of a graft copolymer sample, and acetone is added in an amount 50 times the amount of the copolymer sample. The mixture is refluxed at 60° C. for 2 hours, and is then cooled to room temperature and subjected to centrifugal separation to recover the insoluble component. Drying is then conducted under vacuum for 5 days to evaporate acetone. The weight ($W_4$ g) of the insoluble component is measured, and the grafting ratio is calculated according to the following formula:

Grafting ratio (%) =

$$\frac{W_4 - W_3 \times \frac{\text{amount charged of rubber portion}}{\text{amount charged of total monomers}}}{W_3 \times \frac{\text{amount charged of rubber portion}}{\text{amount charged of total monomers}}} \times 100$$

An initiator as described above with respect to the acrylic elastomer (A) may be used for the graft polymerization.

The acrylic elastomer latex can be subjected to graft polymerization as it is in the same reactor or in another reactor. The graft polymerization is carried out under normal emulsion polymerization conditions using, if desired, an initiator, a polymerization degree regulator and a crosslinking agent.

The latex of the graft copolymer (B) obtained according to the above-mentioned process is ordinarily subjected to salting-out or acid coagulation, and the precipitated solids are recovered by filtration, washed with water and dried. The graft copolymer (B) is thus recovered in the form of a powder.

As the plasticizer, there can be used not only primary plasticizers such as dioctyl phthalate, dibutyl phthalate and other phthalic acid esters, but also secondary plasticizers, for example, aliphatic dibasic acid esters such as dioctyl adipate and dioctyl azelate; aliphatic esters such as butyl oleate and methyl acetylricinolate, glycol esters such as diethylene glycol dibenzoate; phosphoric acid esters such as tricresyl phosphate; epoxy plasticizers such as epoxidized soybean oil; and trimellitic acid esters such as trioctyl trimellitate; and polymeric plasticizers such as polyester plasticizers, nitrile rubbers and ethylene/vinyl acetate copolymers.

The non-rigid vinyl chloride polymer resin composition of the present invention comprises 100 parts by weight of the above-mentioned vinyl chloride polymer resin, 5 to 50 parts by weight of the specific graft copolymer (B) obtained according to the above-mentioned process and 10 to 300 parts by weight of the above-mentioned plasticizer. If the amount of the graft copolymer (B) is smaller than 5 parts by weight, the effect of improving the impact resistance is low. If the amount of the graft copolymer (B) is larger than 50 parts by weight, the inherent mechanical characteristics of the vinyl chloride polymer resin are degraded.

The non-rigid vinyl chloride polymer resin composition of the present invention is formed by mixing predetermined amounts of the vinyl chloride polymer resin, the graft copolymer and the plasticizer, preferably in the powdery state, by using a ribbon blender, a Henschel mixer or the like. The resulting composition is molded and processed by a known kneader, for example, a mixing roll, a Bambury mixer, an extruder or an injection molding machine.

At the mixing step, a known stabilizer, lubricant or colorant may be added according to need.

The present invention will now be described in detail with reference to the following examples. In the following examples and comparative examples, all of "parts" and "%" are by weight.

The degree of swelling of the acrylic elastomer and the grafting ratio of the graft copolymer were determined according to the methods described hereinbefore.

The Izod impact strength was determined by the V-notched Izod impact test method according to ASTM D-256.

The tensile elongation at break at 140° C. was determined by the tensile test using a dumbbell specimen prepared according to ASTM D-638.

EXAMPLE 1

(A) Preparation of Acrylic Elastomer Latex

A reaction vessel was charged with 180 parts of nitrogen-substituted deionized water, and then 0.5 part of boric acid, 0.045 part of anhydrous sodium carbonate, 1.5 parts of potassium oleate and 0.15 part of sodium persulfate were incorporated and dissolved in water. A mixture comprising 98.5 parts of n-butyl acrylate and 1.5 parts of divinylbenzene was added dropwise to the solution over a period of 2 hours while maintaining the temperature at 70° C. After completion of the dropwise addition, the mixture was maintained at the same temperature for 1 hour to complete the polymerization. The polymerization ratio was 99% and the obtained acrylic elastomer had an average particle size of 0.23 μm and a degree of swelling of 12.0. The pH value of the polymer latex was 7.2.

(B) Preparation of Graft Copolymer

A reaction vessel was charged with 100 parts (as solids) of the acrylic elastomer latex obtained in (A) above, 100 parts of deionized water, 0.2 part of sodium formaldehyde sulfoxylate and 0.5 part of potassium oleate. A liquid mixture comprising 25 parts of methyl methacrylate, 10 parts of styrene, 5 parts of acrylonitrile 0.15 part of cumene hydroperoxide was added dropwise over a period of 90 minutes while maintaining the temperature at 70° C. After completion of the dropwise addition, the mixture was maintained at the same temperature for 1 hour to complete the polymerization. Then, a liquid mixture comprising 20 parts of methyl methacrylate and 0.07 part of cumene hydroperoxide was added dropwise to the reaction mixture over a period of 1 hour to advance the polymerization. After completion of the dropwise addition, the reaction mixture was maintained at the same temperature for 1 hour to complete the polymerization. The conversion was higher than 98%, and the obtained graft copolymer had a particle size of 0.28 μm and a grafting ratio of 7%.

This graft copolymer latex was added to an aqueous solution of sulfuric acid to effect acid coagulation. The resultant polymer was washed with water, dehydrated and dried to obtain a powder.

(C) Preparation of Vinyl Chloride Resin Composition

To 100 parts of a composition comprising 30 parts of the graft copolymer obtained in (B) above and 70 parts of PVC having an average polymerization degree of 700 were added 2 parts of a Ba/Zn composite stabilizer and 50 parts of trioctyl trimellitate, and the mixture was heated at 110° C. and blended in a Henschel mixer to obtain a homogeneous mixture.

The thus-prepared vinyl chloride polymer resin composition was kneaded for 3 minutes by a mixing roll maintained at 175° C. and formed into a sheet. The obtained sheet was formed into a test piece by heat-pressing. By using the thus-prepared test piece, the Izod impact strength and the tensile elongation at break at 140° C. were measured according to the above-mentioned methods. The obtained results are shown in Table 1.

EXAMPLES 2 THROUGH 4 AND COMPARATIVE EXAMPLES 1 THROUGH 3

Vinyl chloride polymer resin compositions were prepared in the same manner as described in Example 1 except that the kind and amount of the crosslinking agent were changed as shown in Table 1. The physical properties were determined in the same manner as described in Example 1.

The obtained results are shown in Table 1.

TABLE 1

| | Crosslinking agent | | Degree of swelling of acrylic elastomer | Grafting ratio (%) of graft copolymer | Izod impact strength (kg-cm/cm$^2$) | Tensile elongation at break (140° C.) (%) |
|---|---|---|---|---|---|---|
| | kind | Amount (%) | | | | |
| Example 1 | Divinylbenzene | 1.5 | 12.0 | 7 | 49.3 | 205 |
| Example 2 | Dicylcopentenyl | 2.0 | 14.0 | 16 | 48.2 | 321 |

TABLE 1-continued

|  | Crosslinking agent | | Degree of swelling of acrylic elastomer | Grafting ratio (%) of graft copolymer | Izod impact strength (kg-cm/cm$^2$) | Tensile elongation at break (140° C.) (%) |
|---|---|---|---|---|---|---|
|  | kind | Amount (%) |  |  |  |  |
| Example 3 | acrylate Dicylcopentenyl acrylate | 3.0 | 10.5 | 30 | 43.7 | 191 |
| Example 4 | 1,3-Butylene glycol dimethacrylate | 1.0 | 21.3 | 3 | 47.1 | 184 |
| Comparative Example 1 | Triallyl cyanurate | 2.0 | 3.5 | 57 | 25.4 | 125 |
| Comparative Example 2 | 1,3-Butylene glycol dimethacrylate | 0.3 | 33.2 | 0.5 | 47.8 | 143 |
| Comparative Example 3 | — | — | Completely dissolved | 0 | 8.4 | 110 |

EXAMPLES 5 THROUGH 7 AND COMPARATIVE EXAMPLES 4 AND 5

An acrylic elastomer latex was prepared in the same manner as described in (A) of Example 1 except that 2-ethylhexyl acrylate was used instead of n-butyl acrylate. The obtained acrylic elastomer had an average particle size of 0.23 μm and a degree of swelling of 13.5. The pH value of the polymer latex was 7.2.

Five graft copolymers were prepared in the same manner as described in (B) of Example 1 except that 100 parts (as solids) of the thus-obtained acrylic elastomer was grafted in one stage with 60 parts of a monomer mixture comprising monomers shown in Table 2 in amounts shown in Table 2.

Vinyl chloride polymer resin composition were prepared by using these five graft copolymers and PVC used in (C) of Example 1 in the same manner as described in (C) of Example 1, and the physical properties were evaluated in the same manner as described in Example 1. The obtained results are shown in Table 2.

EXAMPLES 8 AND 9 AND COMPARATIVE EXAMPLES 6 AND 7

An acrylic elastomer latex was prepared in the same manner as described in (A) of Example 1 except that octyl acrylate was used instead of n-butyl acrylate. The obtained acrylic elastomer had an average particle size of 0.23 μm and a degree of swelling of 16.2. The pH value of the polymer latex was 7.2.

Four graft copolymers were prepared in the same manner as described in (B) of Example 1 except that 100 parts (as solids) of the thus-obtained elastomer latex was grafted in one stage with an amount, shown in Table 3, of a monomer mixture comprising 75% of methyl methacrylate, 15% of styrene and 10% of acrylonitrile.

Vinyl chloride polymer resin compositions were prepared by using these four graft copolymers and PVC used in Example 1 in the same manner as described in (C) of Example 1, and the physical properties were evaluated in the same manner as in Example 1. The obtained results are shown in Table 3.

TABLE 2

|  | Degree of Swelling of acrylic elastomer | Kinds and amounts (%) of momomers grafted | | | | | Grafting ratio (%) of graft copolymer | Izod impact strength (kg-cm/cm$^2$) | Tensile elongation at break (140° C.) (%) |
|---|---|---|---|---|---|---|---|---|---|
|  |  | MMA | BMA | EA | St | AN |  |  |  |
| Example 5 | 13.5 | 65 | — | — | 25 | 10 | 6 | 49.9 | 244 |
| Example 6 | 13.5 | 40 | 25 | — | 35 | — | 5 | 45.6 | 235 |
| Example 7 | 13.5 | 30 | 30 | — | 30 | 10 | 5 | 48.2 | 246 |
| Comparative Example 4 | 13.5 | 30 | — | 30 | 25 | 15 | 4 | 32.0 | 158 |
| Comparative Example 5 | 13.5 | 30 | — | 20 | 50 | — | 4 | 29.6 | 177 |

Note the abbreviation in Table 2 indicates the following monomers.
MMA: methyl methacrylate
BMA: butyl methacrylate
EA: ethyl acrylate
St: styrene
AN: acrylonitrile

TABLE 3

|  | Degree of swelling of acrylic elastomer | Amount (parts) of monmoer mixture grafted | Grafting ratio (%) of graft copolymer | Izod impact strength (kg-cm/cm$^2$) | Tensile elongation at break (140° C.) (%) |
|---|---|---|---|---|---|
| Example 8 | 16.2 | 60 | 7 | 48.6 | 241 |
| Example 9 | 16.2 | 100 | 13 | 45.2 | 272 |
| Comparative Example 6 | 16.2 | 10 | 2 | 18.3 | 187 |
| Comparative Example 7 | 16.2 | 200 | 46 | 13.5 | 102 |

EXAMPLES 10 THROUGH 12 AND COMPARATIVE EXAMPLE 8

Vinyl chloride polymer resin compositions were prepared in the same manner as described in (C) of Example 1 except that the graft copolymer prepared in Example 2 was used in amounts shown in Table 4. The physical properties were determined in the same manner as described in Example 1. The obtained results are shown in Table 4.

TABLE 4

| | Amount (parts) of graft copolymer | Izod impact (kg-cm/cm$^2$) | Tensile elongation at break (140° C.) (%) |
|---|---|---|---|
| Example 10 | 25 | 27.5 | 255 |
| Example 11 | 30 | 48.2 | 231 |
| Example 12 | 40 | 54.5 | 215 |
| Comparative Example 8 | 3 | 6.5 | 260 |

EXAMPLES 13 AND 14 AND COMPARATIVE EXAMPLE 9

Vinyl chloride polymer resin compositions were prepared in the same manner as described in (C) of Example 1 except that the graft copolymer obtained in Example 2 was used and the kind and amount of the plasticizer were changed as shown in Table 5. The physical properties were evaluated in the same manner as in Example 1. The obtained results are shown in Table 5.

TABLE 5

| | Plasticizer | | Izod impact strength (kg-cm/m$^2$) | Tensile elongation at break (140° C.) (%) |
|---|---|---|---|---|
| | Kind | Amount (parts) | | |
| Example 13 | Dibutyl phthalate | 50 | 52.1 | 262 |
| Example 14 | Trioctyl trimellitate | 150 | Not broken | 392 |
| Comparative Example 9 | Dibutyl phthalate | 5 | 25.1 | 122 |

EXAMPLE 15 AND COMPARATIVE EXAMPLES 10 AND 11

Two vinyl chloride polymer resin compositions were prepared in the same manner as described in (C) of Example 1 except that commercially available PVC modifiers, that is, a methyl methacrylate/butadiene/styrene copolymer resin (MBS resin) and chlorinated polyethylene (CPE), were separately used.

Test pieces were prepared from these vinyl chloride polymer resin compositions and the vinyl chloride polymer resin composition obtained in Example 2 by carrying out heat-pressing in the same manner as described in (C) of Example 1. These test pieces were subjected to an accelerated exposure test for a predetermined time by using a weatherometer (Model WE-II supplied by Toyo Rika Kogyo Kabushiki Kaisha). Then, the Izod impact strength was measured and the degree of discoloration after 600 hours' accelerated exposure was evaluated. The obtained results are shown in Table 6. From the results shown in Table 6, it is seen that the composition of the present invention has excellent weatherability.

TABLE 6

| | Modifier | Izod impact strength (kg-cm/cm$^2$) after accelerated exposure | | | | Discoloration degree after 600 hours' accelerated exposure |
|---|---|---|---|---|---|---|
| | | before exposure | after 100 hours | after 300 hours | after 600 hours | |
| Example 15 | Graft copolymer of Example 2 | 50.2 | 46.2 | 43.8 | 41.6 | A |
| Comparative Example 10 | MBS resin | 56.7 | 14.6 | 12.5 | 10.9 | C |
| Comparative Example 11 | CPE | 38.4 | 33.1 | 27.8 | 21.8 | B |

Note The discoloration degree was evaluated according to the following scale.
A: no substantial discoloration
B: slight discoloration
C: prominent discoloration

We claim:
1. A non-rigid vinyl chloride polymer resin composition comprising:
   (i) 100 parts by weight of a vinyl chloride polymer resin comprising at least 70% by weight of units derived from vinyl chloride,
   (ii) 5 to 50 parts by weight of a graft copolymer obtained by graft-polymerizing 25 to 150 parts by weight of an alkyl ester of methacrylic acid having 1 to 4 carbon atoms in the alkyl group or a monomer mixture composed of at least 50% by weight of said alkyl ester of methacrylic acid onto 100 parts by weight of an acrylic elastomer having a degree of swelling of 5 to 25 so that the grafting ratio is not larger than 50%, which elastomer is obtained by polymerizing a mixture comprising an alkyl ester of acrylic acid having 2 to 10 carbon atoms in the alkyl group or a monomer mixture composed of at least 50% by weight of said alkyl ester of acrylic acid, and a polyfunctional crosslinking agent, and
   (iii) 10 to 300 parts by weight of a plasticizer.
2. A non-rigid vinyl chloride polymer resin composition according to claim 1, wherein the alkyl ester of acrylic acid is at least one monomer selected from the group consisting of n-butyl acrylate, n-octyl acrylate and 2-ethylhexyl acrylate.
3. A non-rigid vinyl chloride polymer resin composition according to claim 1, wherein the alkyl ester of acrylic acid is n-butyl acrylate.
4. A non-rigid vinyl chloride polymer resin composition according to claim 1, wherein the polyfunctional crosslinking agent is at least one compound selected from the group consisting of divinylbenzene, 1,3-butylene glycol dimethacrylate, dicyclopentenyl acrylate and dicyclopentenyl methacrylate.
5. A non-rigid vinyl chloride polymer resin composition according to claim 1, wherein the polyfunctional crosslinking agent is dicyclopentenyl acrylate.
6. A non-rigid vinyl chloride polymer resin composition according to claim 1, wherein the polyfunctional crosslinking agent is dicyclopentenyl methacrylate.
7. A non-rigid vinyl chloride polymer resin composition according to claim 1, wherein the alkyl ester of methacrylic acid is methyl methacrylate.

* * * * *

UNITED STATES PATENT AND TRADEMARK OFFICE
CERTIFICATE OF CORRECTION

PATENT NO. : 4,663,382
DATED : May 5, 1987
INVENTOR(S) : K. Kishida, et al.

It is certified that error appears in the above-identified patent and that said Letters Patent is hereby corrected as shown below:

Column 3, line 10, change "ethyleneglycol" to --ethylene glycol--.

Column 3, line 57, change "5%" to --50%--.

Column 6, line 13, after "acrylonitrile" insert --and--.

Column 6, Table 1, last column of table change "321" to --231--.

Column 9, Table 5, change "(Kg-cm/m$^2$)" to --(Kg-cm/cm$^2$)--.

Signed and Sealed this

Tenth Day of November, 1987

Attest:

DONALD J. QUIGG

Attesting Officer

Commissioner of Patents and Trademarks